Sept. 21, 1926.
E. MACH
1,600,686
COMBINATION BUMPER, SPARE TIRE, AND TRUNK CARRIER
Filed Dec. 4, 1925  2 Sheets-Sheet 2
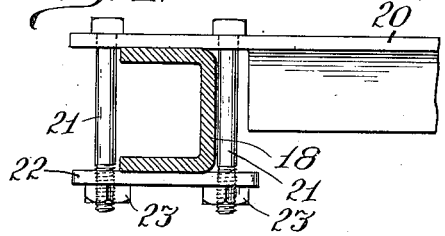
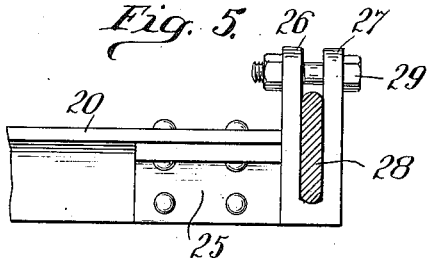
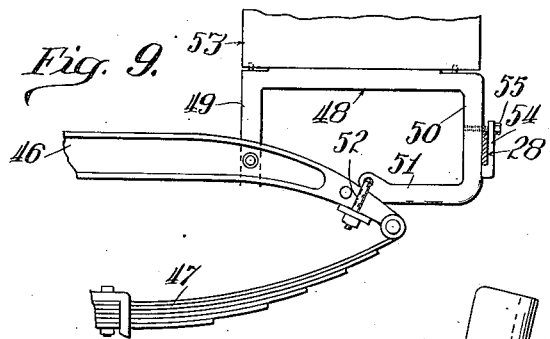
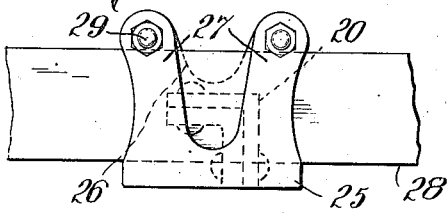
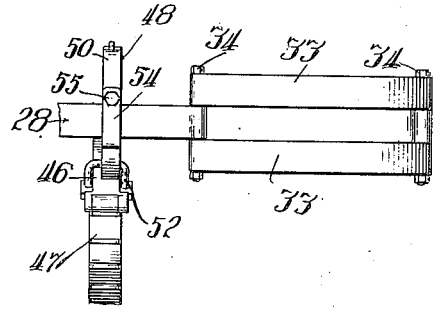
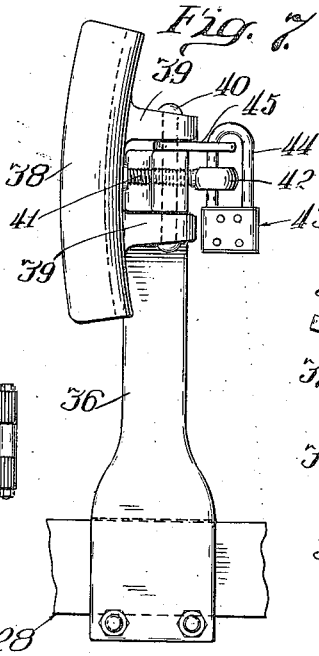
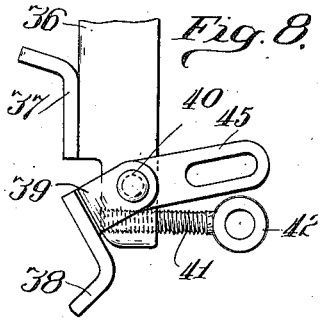
Inventor
Edward Mach
By Leslie W. Fricke
Attorney Patented Sept. 21, 1926.

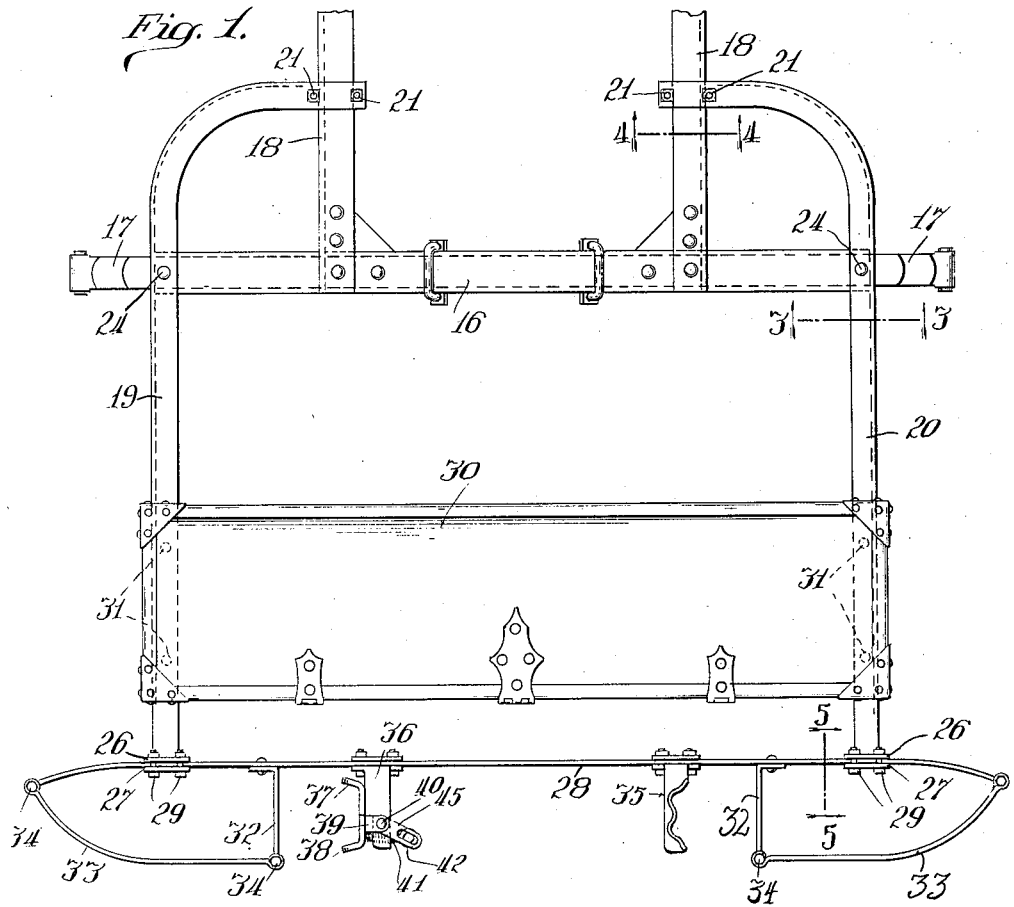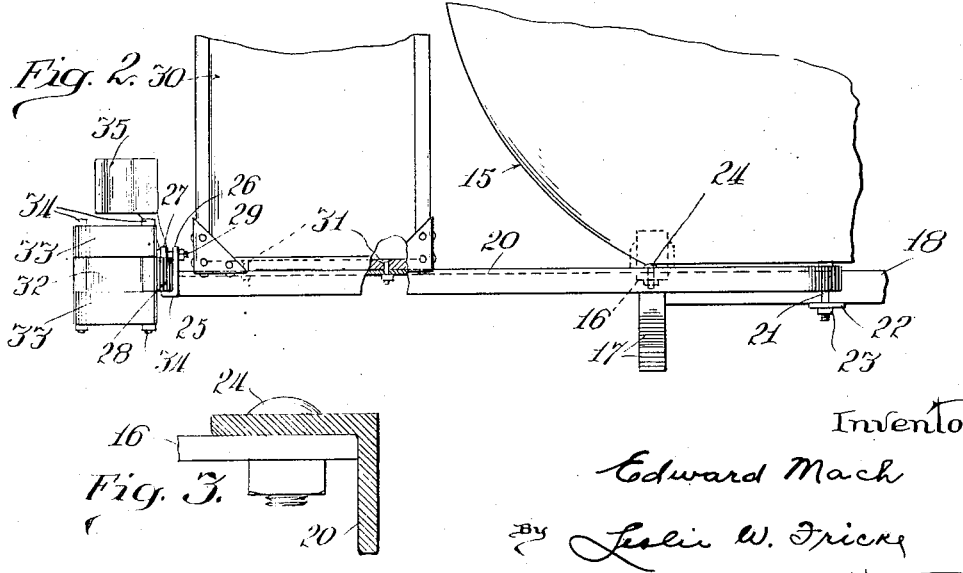

1,600,686

UNITED STATES PATENT OFFICE.

EDWARD MACH, OF CHICAGO, ILLINOIS.

COMBINATION BUMPER, SPARE TIRE, AND TRUNK CARRIER.

Application filed December 4, 1925. Serial No. 73,108.

My invention relates to combination bumper, spare tire and trunk carriers, and it has for its principal object the provision of a new and improved form and arrangement of parts in a device of this type by which the several elements may be attached in position upon an automobile easily and quickly so as to be held firmly and securely. It is another object of my invention to provide improved locking means for holding a tire on the carrier therefor and for locking it against removal. It is still another object of my invention to provide improved means for securing the attaching parts in position whereby the several members are interbraced so that they cooperate with each other for effecting the desired results.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings:—

Fig. 1 is a top plan view of a trunk and end bumper devices, together with the means for securing the spare tire thereon, showing the means for securing such parts in position, and showing also certain of the parts of the frame-work of the automobile;

Fig. 2 is a side view of the parts shown in Fig. 1, but with a fragmentary portion of the body of the automobile attached thereto;

Figs. 3, 4 and 5 are enlarged detail views, being sections taken respectively on lines 3—3, 4—4 and 5—5 of Fig. 1;

Fig. 6 is an enlarged detail view of the bracket shown in Fig. 5 as seen from the right in said figure;

Fig. 7 is an enlarged detail rear view of the adjustable arm shown at the left in Fig. 1 by which the spare tire is held in position;

Fig. 8 is a top plan view of the parts shown in Fig. 7, but with the clamping plate for the spare tire shown in a changed position;

Fig. 9 is a side view of a modified form of securing means attached to a fragmentary portion of a different type of automobile, the rear cross bar being shown in position thereon; and Fig. 10 is a rear face view of the parts shown in Fig. 9, but with the complete end bumper in position thereon.

Referring to the several figures of the drawings, in which corresponding parts are indicated by the same reference characters,— 15 indicates the body of a Ford automobile secured by any suitable means upon a transversely positioned frame bar 16 which is supported from the axle of the car by means of a suitable spring or springs 17. Rigidly connected with the bar 16 and extending forwardly therefrom are the longitudinally extending frame bars 18 of the automobile, the body 15 being secured rigidly to the bar 16 and the bars 18 in close proximity to such bars.

The improved means employed by me for mounting the trunk and other parts upon such frame of the car comprises forwardly extending bars 19 and 20, each in the form of an angle iron, each of the bars being bowed inwardly at its front end, the ends of the bars being rigidly connected with the side bars 18 of the frame. As is best shown in Fig. 4, the vertical web of the angle iron is cut away at the inner end of the bowed arm of the bar, so as to permit the horizontal web of the bar to rest in contact with the top face of the side bar 18 of the car frame. Bolts 21 are passed through holes in the end of the horizontal flange, such bolts standing on opposite sides of the bar 18 and being provided on their lower ends with a keeper plate 22 which is secured in position by means of nuts 23. As will be readily understood, the nuts may be tightened for attaining a very tight grip of the bars 18 at opposite sides of the machine for holding the bars 19 and 20 from movement longitudinally of the frame along the bars 18.

As is best shown in Fig. 3, the angle iron bars 19 and 20 have their vertical flanges in contact with the outer ends of the transverse bar 16 of the frame of the automobile, the horizontal flanges of such bars 19 and 20 being supported by direct contact with the upper face of said bar 16. In the construction shown, bolts 24 are passed through suitable openings in the bars 19 and 20 for securing such bars to the transverse bar 16.

Upon their end portions, each of the bars 19—20 is provided with a bracket 25 in the form of a casting, each of said castings being provided with jaws or arms 26 and 27 normally standing in spaced relation to each other, as is best shown in Fig. 5. Secured between the jaws 26 and 27 at each side of the machine and extending across the machine in rear of the body 15, I have provided a transverse bar 28 which serves as a tensioning bar for bracing the bars 19 and 20 laterally with respect to each other and for holding the vertical flanges of the bars 19 and 20 tightened against the ends of the transverse bar 16 of the frame of the automobile. The jaws 26 and 27 are brought into gripping relation to the bar 28 by means of bolts 29 extending through the upper ends of the jaws, as is clearly shown in Figs. 5 and 6.

Mounted upon the bars 19 and 20 which extend rearwardly from the frame of the machine as above described, there is a trunk or locker 30 of any suitable construction, such trunk being secured by means of bolts 31 directly to such bars. The trunk 30 is supported by the bars 19 and 20, but it serves as a means for bracing such bars transversely with respect to each other.

Upon the end portions of the transverse bar 28, I have provided end bumpers comprising arms 32 extending rearwardly from the bar 28, the rear ends of the arms 32 being connected with the inner end portions of bowed bars 33, the outer ends of which are connected to the bowed outer ends of the bar 28. The transverse bar 28 and the bars 33 are preferably formed of spring metal so as to yield slightly upon impact with another body, such bars being at the same time stiff enough and strong enough to present a considerable resistance to such impact. The bars 33 are connected with the ends of the bar 28 and the rear ends of the arms 32 by any suitable means such as by bolts 34 as shown.

I have provided for mounting a spare tire upon the bar 28 in the space between the end bumpers, such mounting means comprising a bracket 35 rigidly mounted upon the transverse bar 28 at one side of the machine and cooperating bracket means at the opposite side of the machine, the arrangement being such that a spare tire can be slipped into position upon the brackets and removably secured thereon. For effecting this result, the bracket at the left side of the machine in Fig. 1 is made adjustable, comprising an arm 36 carrying at its upper end a plate 37 mounted in fixed position and a plate 38 pivotally mounted in position. As is best shown in Fig. 7, the plate 38 is provided with lugs 39 on its back face, which lugs are pivotally connected with the upper end of the arm 36 by means of a vertically disposed bolt 40 so that the plate 38 can be displaced as shown in Fig. 8 for permitting the positioning of the spare tire upon the brackets. A set screw 41 is provided, secured by means of screw threads in the end of the arm 36 in position to be tightened against the outside face of the plate 38 for holding the plate in operative gripping position with respect to a tire. The screw 41 in the construction shown is provided with an eye 42 which is adapted to be secured by means of a padlock 43, the hasp 44 of which passes through the eye 42 and through an opening in a link 45 pivotally mounted upon the bolt 40 for holding the set screw locked against rotation.

Referring now to Figs. 9 and 10, which show a modified form of construction, the bar 28 which serves as the tensioning means in rear of the body of the automobile and which carries the end bumpers, is mounted in position by the use of a different arrangement of parts. In the construction shown in these figures, the frame of the automobile comprises frame bars 46 at opposite sides of the automobile, such side bars being bowed downwardly at their rear ends where they are connected to semi-elliptical springs 47. Upon the rear end portion of the bar 46 at each side of the machine, I have mounted a bracket comprising a horizontal bar 48 which is provided at its front end with a downwardly extending arm 49 which is secured at its lower end to the frame bar 46 of the automobile. At the rear end, the horizontal bar 48 is provided with a downwardly extending bar 50 which at its lower end is provided with a forwardly extending arm 51 secured to the frame bar 46 by means of a U clip 52. The horizontal bars 48 of these two brackets are adapted to support a trunk or locker 53 thereon, such trunk being secured in position in any suitable manner. The transverse bar 28 is preferably secured in position upon the rear faces of the bars 50 by means of jaws or clips 54 which are provided in spaced relation to the bars 50 so as to receive the bar 28, the upper ends of the jaws 54 being pressed firmly toward the bars 50 by the use of bolts 55. By this construction, the brackets as above described serve to support the trunk 53 and the bar 28, but the trunk 53 and the bar 28 serve to brace the brackets laterally with respect to each other. The bar 28 is designed to be provided with spare tire supporting means in accordance with the description given above in connection with the other figures.

By the use of my improved mechanism, I am enabled very quickly and easily to apply the carrier in position upon an automobile frame for supporting the trunk, the end bumpers, and the spare tire as designated, the parts being quite rigid and being interbraced so as to provide very strong resistance in case of impact upon any of the parts.

While I have shown the tire brackets 35 and 36 in horizontally spaced relation at opposite sides of the machine mounted directly on the transverse bar 28, it will be understood that the brackets might be otherwise arranged and otherwise carried by the bar 28 without departing from my invention, and my claims are to be construed accordingly.

While I prefer to employ the constructions as shown in the drawings and as above described, I wish to have it understood that I do not wish to be limited to the precise construction except as the same is specifically claimed, inasmuch as it is evident that changes may well be made in the construction without departing from the spirit of my invention.

I claim:

1. A carrier device for an automobile, comprising two bars bowed inwardly at their forward end portions and overlying the longitudinally extending frame bars of the automobile, bolts secured in said bowed bars on opposite sides of the frame bars, keepers mounted on said bolts below the frame bars and held thereby positively in fixed position with respect to the bowed bars and serving to secure the bowed bars firmly in position with respect to said frame bars, and a transversely extending bar supported by said first named bars and bracing them transversely with respect to each other.

2. A combination carrier device for an automobile, comprising two longitudinally extending bars secured rigidly in position at opposite sides of the frame, a trunk secured on said bars in rear of the body of the automobile, a transverse bar secured to the rear end portions of said longitudinally extending bars, brackets carried by said transverse bar for removably mounting a spare tire thereon, and end bumpers carried by said transverse bar on opposite sides of the tire brackets.

3. A combination carrier device for an automobile, comprising two parallel bars extending rearwardly from the frame of the automobile, a trunk secured on said bars and supported thereby and serving to brace the bars transversely with respect to each other, clamping jaws on the rear end portions of said parallel bars, a transverse bar secured in said jaws, and means for tightening the jaws on said bar.

4. A combination carrier device for an automobile, comprising two parallel bars extending rearwardly from the frame of the automobile, a trunk secured on said bars and supported thereby and serving to brace the bars transversely with respect to each other, clamping jaws on the rear end portions of said parallel bars, a transverse bar secured in said jaws, means for tightening the jaws on said bar, brackets carried by said transverse bar for removably mounting a spare tire thereon, and end bumpers carried by said transverse bar on opposite sides of the tire brackets.

5. A carrier device for an automobile, comprising two bars bowed inwardly at their forward end portions and secured to the longitudinally extending frame bars of the automobile at a point forward of the rear transverse bar of the automobile frame, a tensioning bar connecting the rear end portions of said bowed bars serving to hold said bars in engagement with the ends of said transverse bar of the automobile frame, and two end bumper devices mounted on the ends of said tensioning bar in rear of the body of the automobile.

6. A carrier device for an automobile, comprising two bars bowed inwardly at their forward end portions and secured to the longitudinally extending frame bars of the automobile at a point forward of the rear transverse bar of the automobile frame, a tensioning bar connecting the rear end portions of said bowed bars serving to hold said bars in engagement with the ends of said transverse bar of the automobile frame, and brackets carried by said tensioning bar for removably mounting a spare tire thereon.

7. A combination carrier device for an automobile, comprising two parallel bars extending rearwardly from the frame of the automobile, a trunk secured on said bars and supported thereby and serving to brace the bars transversely with respect to each other, a transverse tensioning bar connecting the rear end portions of said parallel bars, brackets carried by said transverse bar for removably mounting a spare tire thereon, and two end bumper devices mounted on the ends of said tensioning bar on opposite sides of the spare tire.

8. A carrier device for an automobile, comprising two oppositely disposed brackets, one of which is in the form of a stationary plate, and the other of which is in spaced relation and comprises a pivoted plate portion, a set screw for holding said pivoted plate portion in adjusted position, and means for locking the set screw against rotation.

9. A carrier device for an automobile, comprising two oppositely disposed brackets, one of which is in the form of a stationary plate, and the other of which is in spaced relation and comprises a pivoted plate portion, a set screw for holding said pivoted plate portion in adjusted position, an eye in the end of said set screw, and a perforated pivoted link adapted to be swung into close proximity to said eye for insertion of a padlock for locking the set screw against rotation.

EDWARD MACH.